F. F. FOWLER.
Horse Rake.
No. 31,162.
Patented Jan. 22, 1861.
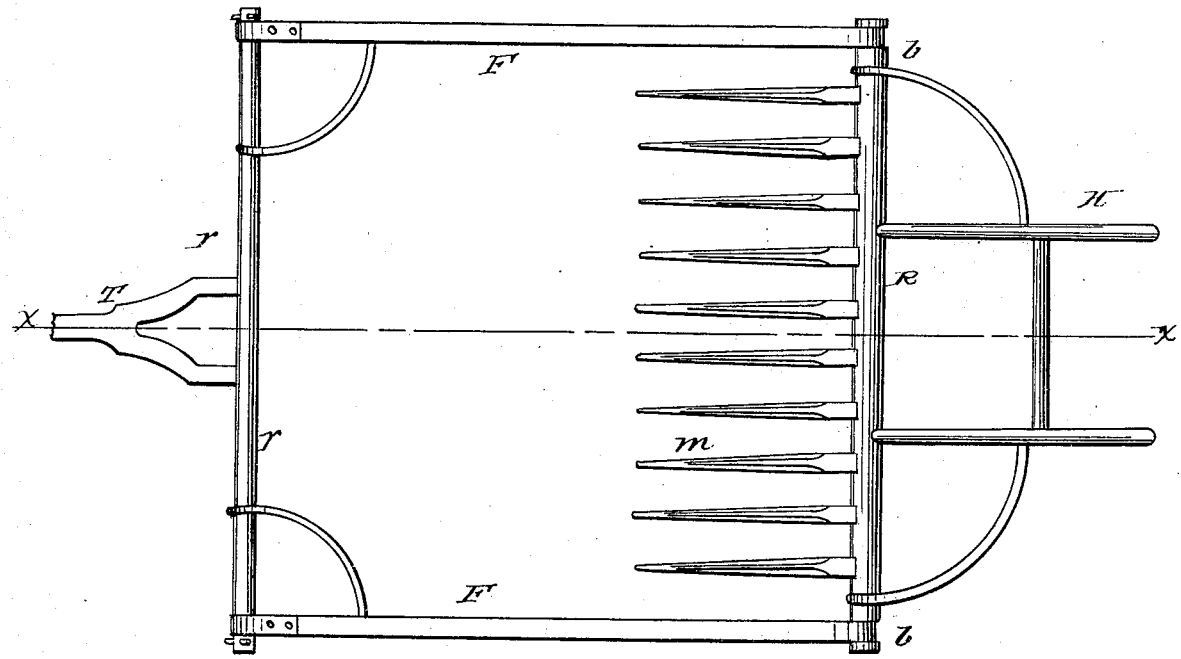
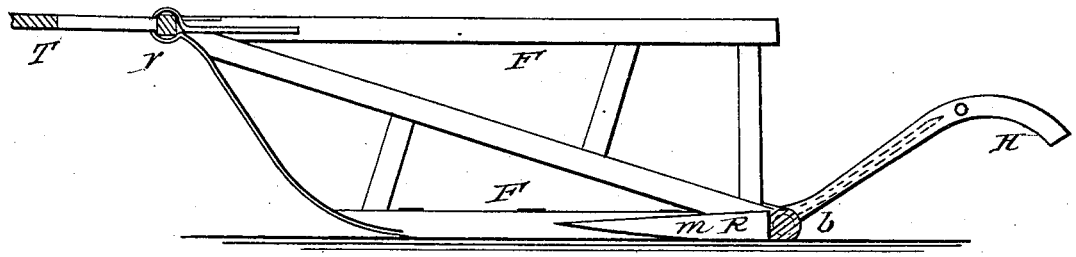

UNITED STATES PATENT OFFICE.

F. F. FOWLER, OF CRANE TOWNSHIP, WYANDOT COUNTY, OHIO.

IMPROVEMENT IN MACHINES FOR GATHERING HAY.

Specification forming part of Letters Patent No. 31,162, dated January 22, 1861.

*To all whom it may concern:*

Be it known that I, F. F. FOWLER, of Crane township, in the county of Wyandot and State of Ohio, have invented a new and useful Improvement in Hay-Gatherers; and I do hereby declare that the following is a full, clear, and exact description of the same, reference being had to the annexed drawings, forming part of this specification, in the several figures of which similar characters of reference denote the same part.

Figure 1 is a top view of the gatherer. Fig. 2 is a vertical section on *x x*.

The design of this machine is to gather and transport to the stack the hay which has previously been raked into a windrow.

The invention consists in the arrangement of two high runners, drawn by a jointed tongue, with a revolving rake having its bearings in the rear portion of said runners, the bearings of the rake and tongue shafts being sufficiently loose and free to permit the runners to conform to the surface of the ground passed over, the details of construction and operation being as follows:

In the drawings, F F are the runners, made strong and braced, as shown at B and C C of Fig. 2, the former running diagonally across from tongue-shaft to rake-shaft.

T is the tongue, attached to the shaft *r*, running across the front portion of the machine.

R is the rake, having teeth *m*, and handles H, resting in bearings *b b*, so as to turn freely therein. This renders the bearings of the two shafts *b* and T the sole connections of the two side frames, with the exception of the two small braces *f f*, which, being loosely attached to the tongue-shaft and secured to the sides, give no rigidity. This construction therefore enables the runner-frames to conform to the surface of the ground passed over, the loose connection of frames and shafts giving every facility for that purpose.

The operation of the gatherer is as follows: After mowing the hay is raked into windrows. Then this machine is driven in direction of the length of the windrow, and the hay collected and drawn to the stack, resting upon the rake and between the side runners. When required to be discharged the rake is allowed to revolve and the machine passes from the hay.

The quantity that can be conveyed by this machine is very large, and is a great advantage over the method of hauling to the stack.

I do not claim rigid sleds with rakes or forks for removing deposits; nor do I claim machines supported upon wheels with semi-revolving forks for such purpose, as such is not in my invention; but

I claim as new and of my own invention—

As a hay-conveyer, the arrangement of runners F, braced as described, with the revolving rake R, tongue T, shaft *r*, and braces *f*, when the several parts have the loose connection described, whereby the machine may conform to the inequalities of the surface passed over, the construction and operation being as set forth.

In testimony whereof I have hereunto signed my name before two subscribing witnesses.

F. F. FOWLER.

Witnesses:
W. T. WILSON,
A. W. BRINKERHOFF.